United States Patent
Khuzadi

(10) Patent No.: US 7,796,018 B2
(45) Date of Patent: Sep. 14, 2010

(54) METHOD AND APPARATUS FOR DESIGNING A HEALTH MONITOR SYSTEM FOR A VEHICLE

(75) Inventor: Mbuyi Khuzadi, Ahaheim, CA (US)

(73) Assignee: The Boeing Company, Chicago, IL (US)

( * ) Notice: Subject to any disclaimer, the term of this patent is extended or adjusted under 35 U.S.C. 154(b) by 423 days.

(21) Appl. No.: 11/757,808

(22) Filed: Jun. 4, 2007

(65) Prior Publication Data

US 2008/0297333 A1 Dec. 4, 2008

(51) Int. Cl.
*B60Q 1/00* (2006.01)

(52) U.S. Cl. .................... 340/438; 340/506; 340/425.5; 340/825.36; 340/825.49

(58) Field of Classification Search .......... 340/438, 340/506, 425.5, 825.36, 825.49
See application file for complete search history.

(56) References Cited

U.S. PATENT DOCUMENTS

| | | | |
|---|---|---|---|
| 5,400,246 A * | 3/1995 | Wilson et al. .................. | 700/17 |
| 6,330,499 B1 | 12/2001 | Chou et al. | |
| 2008/0297375 A1 | 12/2008 | Khuzadi | |

OTHER PUBLICATIONS

Simon, "an Overview of the NASA Aviation Safety Program Propulsion Health Monitoring Element", 36th Joint Propulsion Conference and Exhibit, Jul. 2000, Huntsville Alabama, pp. 1-11.

Byington et al., "In-Line Health Monitoring system for Hydraulic Pumps and Motors", Proceedings 2003 IEEE Aerospace Conference, pp. 1-9.

Butas et al., "Rocket Engine Health Monitoring Using a Model-Based Approach" 37th AIAA/ASME/SAE/ASEE Joint Propulsion Conference and Exhibit, Jul. 2001, Salt Lake City, Utah, pp. 1-13.

"ISHEM 2005 Abstracts", First International Forum on Integrated system Health Engineering and Management in Aerospace, Nov. 2005, Napa, California, pp. 1-118.

Bickmore, "Sensor Validation", Proceedings Conference on Advanced Earth-to-Orbit Propulsion Technology, George C. Marshall Space Flight Center, Alabama, 1994, pp. 544-553.

Schwabacher et al., "The NASA Integrated Vehicle Health Management Technology Experiment for X-37", 2002 Society of Photo-Optical Instrumentation Engineers, Proceedings of the SPIE AeroSense 2002 Symposium, pp. 1-12.

* cited by examiner

*Primary Examiner*—Daryl Pope
(74) *Attorney, Agent, or Firm*—Yee & Associates, P.C.; John A. Lepore

(57) ABSTRACT

A computer implemented method, apparatus, and computer usable program code for designing a health monitor system for a vehicle. A functional model of the vehicle is created. A hazardous condition is identified that can occur during operation of the vehicle using the functional model. A model of causes is created for the hazardous condition and hazard cause controls are identified to avoid the hazardous condition using the model of causes, wherein the controls prevent causes of the hazardous condition from occurring. A set of monitors is identified to monitor the controls.

20 Claims, 7 Drawing Sheets

METHOD AND APPARATUS FOR DESIGNING A HEALTH MONITOR SYSTEM FOR A VEHICLE

CROSS REFERENCE TO RELATED APPLICATION

The present invention is related to the following patent application: entitled "A Health Monitoring System for Preventing a Hazardous Condition", Ser. No. 11/757,797, filed even date hereof, assigned to the same assignee, and incorporated herein by reference.

BACKGROUND INFORMATION

1. Field

The present invention relates generally to an improved data processing system and in particular to a method and apparatus for a monitoring system. Still more particularly, the present invention relates to a computer implemented method, apparatus, and computer usable program code for designing a health monitor system for a vehicle.

2. Background

Safety and reliability of a system, such as is employed in the design and implementation of an aircraft or spacecraft, is important to operating and using that system with a minimal risk of loss. With respect to vehicles, a safe vehicle is a vehicle that can be operated in a manner that mitigates the potential for loss of personnel or assets, or the potential for a failure to accomplish a mission. A vehicle is not very valuable regardless of its capabilities if the vehicle injures or kills an operator or other individual during operation. Additionally, a vehicle is not very valuable if the vehicle damages itself, cannot be maintained within specifications for extended periods, or does not have the capability to complete a mission due to failures of different systems or components.

To avoid these types of situations, a health monitor system is employed to monitor the operation of a complicated system, such as a vehicle, and determine when the vehicle is operating as designed and in a manner that minimizes potential loss. An example of a health monitor is an electronic unit that tracks a real physical parameter such as the behavior of a single sub-system or line replaceable unit within the vehicle. This health monitor system operates in a manner that does not affect the operation of the vehicle while tracking this parameter. In more sophisticated cases, sensors may be distributed throughout the vehicle as a network that may be used to obtain a complete picture of the state of the entire vehicle.

An aircraft contains a health monitor system that monitors various sub-systems in the aircraft. Current health monitor systems focus on monitoring components in an aircraft. This type of system monitors for component failures or indications that component failures may occur. The monitoring is performed by gathering data from these components or sensors associated with the components. For example, a health monitor system may be implemented for monitoring hydraulic pumps and motors used in aircraft hydraulic systems. These types of sub-systems are typically used to actuate flight control surfaces, thrust vectoring and reverse mechanisms, landing gear, cargo doors, and in some cases, weapon systems.

For example, an aileron control is a sub-system in an aircraft that controls ailerons, which are hinged control surfaces attached to the trailing edge of an aircraft wing used to control lift for a wing. A loss of a single aileron control in an aircraft may pose a potential safety hazard to the crew, passengers, and any other structures or people in the vicinity of the aircraft. However, a single aileron loss has a limited impact on the vehicle because the aircraft has redundant operational techniques for controlling the aircraft. The health monitor system in an aircraft generates an alert to indicate that the aileron needs to be replaced to avoid a potential hazardous condition.

SUMMARY

The advantageous embodiments of the present invention provide a computer implemented method, apparatus, and computer usable program code for designing a health monitor system for a vehicle. A functional model of the vehicle is created. A hazardous condition is identified that can occur during operation of the vehicle using the functional model. A model of causes is created for the hazardous condition and hazard cause controls are identified to avoid the hazardous condition using the model of causes, wherein the controls prevent causes of the hazardous condition from occurring. A set of monitors is identified to monitor the controls.

The advantageous embodiments also provide a computer implemented method for designing a system, wherein a set of hazardous conditions is identified for the system. A model for the set of hazardous conditions is created. The model contains causes for the set of hazardous conditions. A set of controls for the causes is identified to prevent the set of hazardous conditions from occurring. A monitoring system is designed to monitor the set of controls for the system.

In yet another advantageous embodiment of the present invention, a computer program product contains a computer usable medium having computer usable program code for designing a health monitor system for a vehicle. The computer program product includes computer usable program code for creating a functional model of the vehicle. The computer usable program code identifies a hazardous condition that can occur during operation of the vehicle using the functional model. The computer program product also includes computer usable program code to create a model of causes for the hazardous condition. Computer usable program code is present for identifying controls to avoid the hazardous condition using the model of causes, wherein the controls prevent causes of the hazardous condition from occurring. The computer program product also includes computer usable program code for identifying a set of monitors to monitor the controls.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

DETAILED DESCRIPTION

Figure 1:
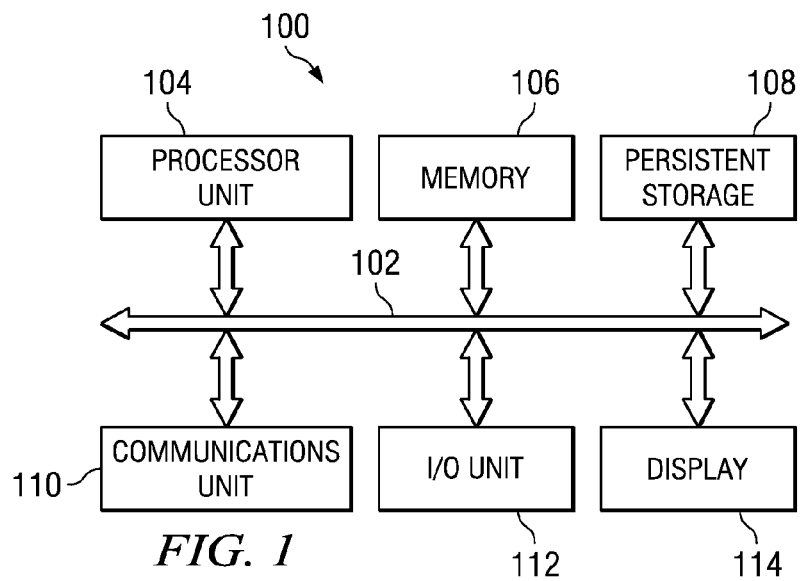
FIG. 1 is a diagram of a data processing system depicted in accordance with an illustrative embodiment of the present invention.

Turning now to FIG. 1, a diagram of a data processing system with a single communication bus is depicted in accordance with an illustrative embodiment of the present invention. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. Memory 106, in these examples, may be, for example, a random access memory. Persistent storage 108 may take various forms depending on the particular implementation. For example, persistent storage 108 may be, for example, a hard drive, a flash memory, a rewritable optical disk, a rewritable magnetic tape, or some combination of the above, or other storage media as they become available.

Communications unit 110, in these examples, provides for communications with other data processing systems or devices. In these examples, communications unit 110 is a network interface card. I/O unit 112 allows for input and output of data with other devices that may be connected to data processing system 100. For example, I/O unit 112 may provide a connection for user input through a keyboard and mouse. Further, I/O unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106.

The advantageous embodiments of the present invention provide a computer implemented method, apparatus, and computer usable program code for designing a health monitor system for a vehicle. A functional model of the vehicle is created. One or more hazardous conditions are identified that can occur during operation of the vehicle using the functional model. A model of causes is created for each hazardous condition and hazard cause controls are identified to preclude the development of the hazardous condition using the model of causes to form a set of hazard cause controls. This set contains one or more hazard cause controls, wherein the hazard cause controls prevent causes of the hazardous condition from occurring. A set of monitors is identified to monitor the hazard cause controls. The set of monitors is one or more monitors.

These controls may or may not be parts of the system itself. They may entail, among other things, environment, operational status, and keep out zones. The set that is provided here represents only a small subset of legitimate non-hardware or software controls that preclude the development of a hazard by the cause that it controls. Therefore, the cause control is any thing that keeps the cause from occurring and leading to a hazardous condition.

The different advantageous embodiments recognize that a health monitor system is typically designed and integrated for a system, such as a vehicle when the design is fairly advanced or even completed. Typically, the vehicle design is completed before the health monitor system is created for the vehicle. Further, the different advantageous embodiments recognize that many of the hazardous conditions are not caused by component failures in a system. The different embodiments recognize, that in many cases, operator error or changes in environment may cause the hazardous condition. In these examples, a hazardous condition is a condition in which a potential to cause loss of a person, mission, or system is present. The person may be an operator or person uninvolved with the operation of the system.

As a result, the different advantageous embodiments also take into account additional factors, such as environment or operator error, that may lead to loss of a person, mission or part of the system during operation of said system. By taking into account these and other factors, the different advantageous embodiments increase the safety provided by current health monitor systems.

In the illustrative examples, hazard cause controls are monitored by the health monitor system. A hazard cause control is a mechanism that is used to prevent a cause of a hazardous condition. These hazard causes are, for example, events that may result in a vehicle or other system entering a hazardous condition. For example, excessive pressure in a launch vehicle fuel tank causing the fuel tank to rupture is a hazardous condition. Events that may lead to this hazardous condition include operational error in valves leading to the fuel tank or high pressure inlet valves failing in an open state. These events are also referred to as causes.

The different illustrative embodiments focus on monitoring controls that are designed to prevent these events or causes from occurring. In these illustrative examples, an assumption is made that if the hazard cause control is present and, where applicable, operational, a hazardous condition will not develop due to the cause that is controlled.

Figure 2:
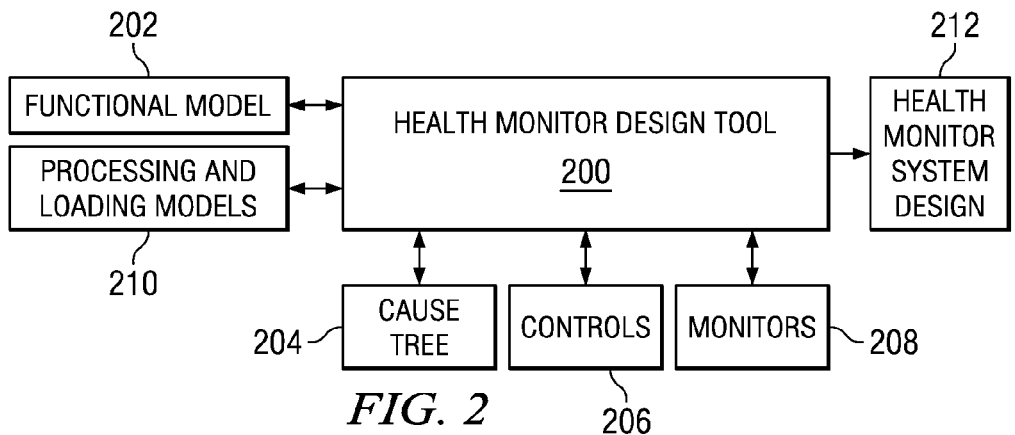
FIG. 2 is a diagram illustrating components used in a process to design a health monitor system in accordance with an advantageous embodiment of the present invention.

Turning now to FIG. 2, a diagram illustrating components used in a process to design a health monitor system is depicted in accordance with an advantageous embodiment of the present invention. In this example, health monitor design tool 200 is an example of a software component that may be executed on a data process system, such as data processing system 100 in FIG. 1. In this example, health monitor design tool 200 is used to generate functional model 202. Functional model 202 is used to perform safety and reliability analysis.

Functional model 202 may be created through user input to health monitor design tool 200. Alternatively, functional model 202 may be provided as an input to health monitor design tool 200. Functional model 202 is used by health monitor design tool 200 to generate cause tree 204.

In these examples, functional model 202 includes a functional and physical description of the system for which a health monitor system is to be designed. In these illustrative examples, the system depicted is a vehicle, such as an aircraft or launch vehicle. Functional model 202, in these examples, supports different types of analyses that may be used to identify hazardous conditions that may occur. One type of analysis may include, for example, likely loads, operational effectiveness under expected environmental conditions, planned operational modes, and hypothetical operational modes. The different analyses performed on functional model 202 are aimed at enabling a system safety analysis.

Health monitor design tool 200 analyzes functional model 202 to generate cause tree 204. This analysis is performed automatically or in conjunction with user input depending on the particular implementation. Cause tree 204 data structure is used to describe the different hazardous conditions that may occur in the vehicle. In these examples, cause tree 204 describes all of the hazardous conditions and characterizes a hierarchical set of causes and sub-causes for the hazardous condition. These causes include their causes and hierarchy of causes that lead to the different hazardous conditions.

Health monitor design tool 200 uses cause tree 204 to identify or define hazard cause controls 206. A hazard cause control in controls 206 is a means used by the system to control and/or prevent a cause, which may or may not be part of the system itself. When user input is used, a user may view functional model 202 using health monitor design tool 200 and identify causes for cause tree 204. In other words, a hazard cause control prevents a hazard cause that may lead to a hazardous condition from occurring. When a hazardous condition is present, the vehicle is not operating normally or as expected. This component may be, for example, a hardware component, software component, or a combination of the two. This component may be, for example, a software process or a sub-system within the vehicle. This component may be, for example, the persistence of an environmental condition that is outside the bounds of the safe operation of the vehicle. This component also may be, for example, the improper operation of the system.

Using cause tree 204 and controls 206, health monitor design tool 200 is used to identify monitors 208. Monitors 208 is part of a monitoring system to monitor the different hazard cause controls within controls 206. In these advantageous embodiments, the monitoring system monitors hazard cause controls 206 in place of or in addition to monitoring sub-systems or components. For example, rather than monitoring a component that may fail, the different illustrative embodiments monitor the hazard cause control that controls that component.

With the identification of controls 206 and monitors 208, health monitor design tool 200 is used to generate processing and loading models 210. These models are used to determine when a hazardous condition is developing when the hazard cause that it monitors provides the means of determining predictive measures of hazardous condition development. The models are also used to determine the speeds with which an answer is needed to respond to the hazardous condition. Processing and loading models 210 are used by health monitor design tool 200 to identify the use of data provided by different systems or monitors within the vehicle. With this information, an identification of design changes may be made if information needed to monitor controls is not available in the current design of the vehicle. The information also may be used to make design changes if the information is available with latencies that preclude the timely identification and reaction to the related hazard.

Further, processing and loading models 210 may be used to identify the amount of calculation and the different processes needed by the health monitor system that is to be used in the vehicle. In other words, processing and loading models 210 may be used to identify resources needed to implement the health monitor system in the vehicle. These resources include, for example, processing power, interfaces to controls, interfaces to other sources of information needed to monitor the controls, an ability of the current system to supply the information at the needed speed, and storage and memory requirements. Further, processing and loading models 210 may be used to identify the different processing platforms needed for the different tasks needed by the health monitor system.

With this information, health monitor design tool 200 may be used to generate health monitor system design 212. This design includes an identification of the hardware and software needed to integrate the health monitor system within a vehicle. Health monitor system design 212 may include updates to the vehicle that are needed. Based on the resources needed by health monitor system design 212, updates to the vehicle design in functional model 202 may be generated to include and properly support a health monitor system within the vehicle. In this manner, health monitor design tool 200 may be used to identify hazardous conditions that may occur for a vehicle and design a health monitor system that monitors for those conditions.

In these illustrative examples, health monitor design tool 200 is illustrated as a single design tool that is used to perform all of the different analyses, model generation, and design generation. This example is for purposes of illustrating one manner of which the different advantageous embodiments of the present invention may be implemented. Of course, the different analyses, model generation, and design generation may be performed using multiple tools, rather than the single tool illustrated in FIG. 2. The illustration of a single tool in FIG. 2 is not meant to imply architectural limitations on the manner in which the different processes for designing a health monitor system may be implemented.

Figure 3:
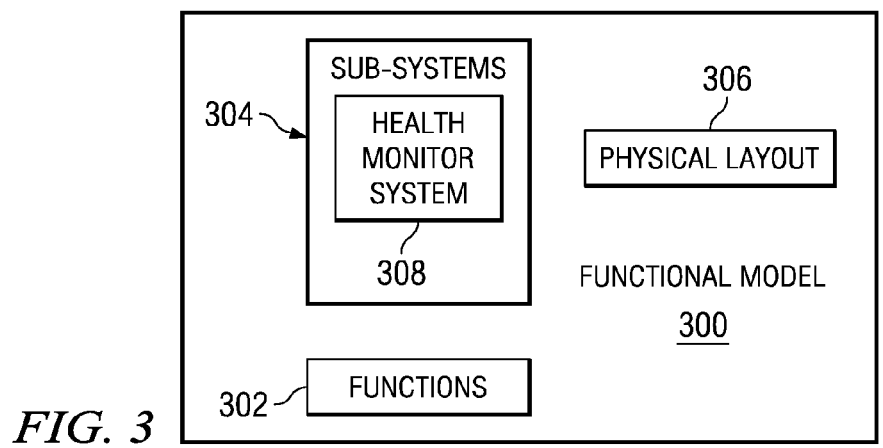
FIG. 3 is a diagram illustrating a functional model in accordance with an advantageous embodiment of the present invention.

Turning now to FIG. 3, a diagram illustrating a functional model is depicted in accordance with an advantageous embodiment of the present invention. In this example, functional model 300 is a more detailed example of a functional model, such as functional model 202 in FIG. 2.

Functional model 300 is created as part of a process for developing a new vehicle in these examples. Functional model 300 contains functions 302, sub-systems 304, and physical layout 306. The different components listed within functional model 300 provide descriptions as to how the different components operate through different phases of operation for the vehicle.

Functions 302 identify different functions of the vehicle. Functions 302 are described with a depth of specificity to provide an isolation of indicators or functional loss. Functions 302 provide sufficient detail identifying all major functions and sub-functions for the vehicle in functional model 300. Further, sub-systems 304 contain a description of the different sub-systems that make up the vehicle in these examples.

Physical layout 306 provides a physical representation of the vehicle. Physical layout 306 contains descriptions that accurately identify how basic physical system components operate and interact. Additionally, physical layout 306 provides a description of interfaces for system components and sub-systems within sub-systems 304. The information about the interfaces also includes an identification of the type and amount of data that is to be handled. This information is later used to describe or make changes to the design of the avionics infrastructure for the vehicle.

Sub-systems 304 include information as to how these sub-systems fit within physical layout 306 and provide the different functions within functions 302. Further, functions 302, sub-systems 304, and physical layout 306 include descriptions of the physical and functional redundancy within the vehicle described by functional model 300.

In other words, functional model 300 contains the information necessary to identify different hazardous conditions during the operation of the vehicle for which functional model 300 is created. Additionally, functional model 300 may be modified as the design process occurs. For example, health monitor system 308 will change as hazardous conditions are identified as well as controls and monitors for those conditions. Further, other portions of functional model 300 may change to enable health monitor system 308 to obtain the data necessary to monitor the various controls.

In these illustrative examples, sub-systems 304 include health monitor system 308 as a sub-system. The description of health monitor system 308 defines the functionality of this component and provides details for a safety analysis.

Figure 4A:
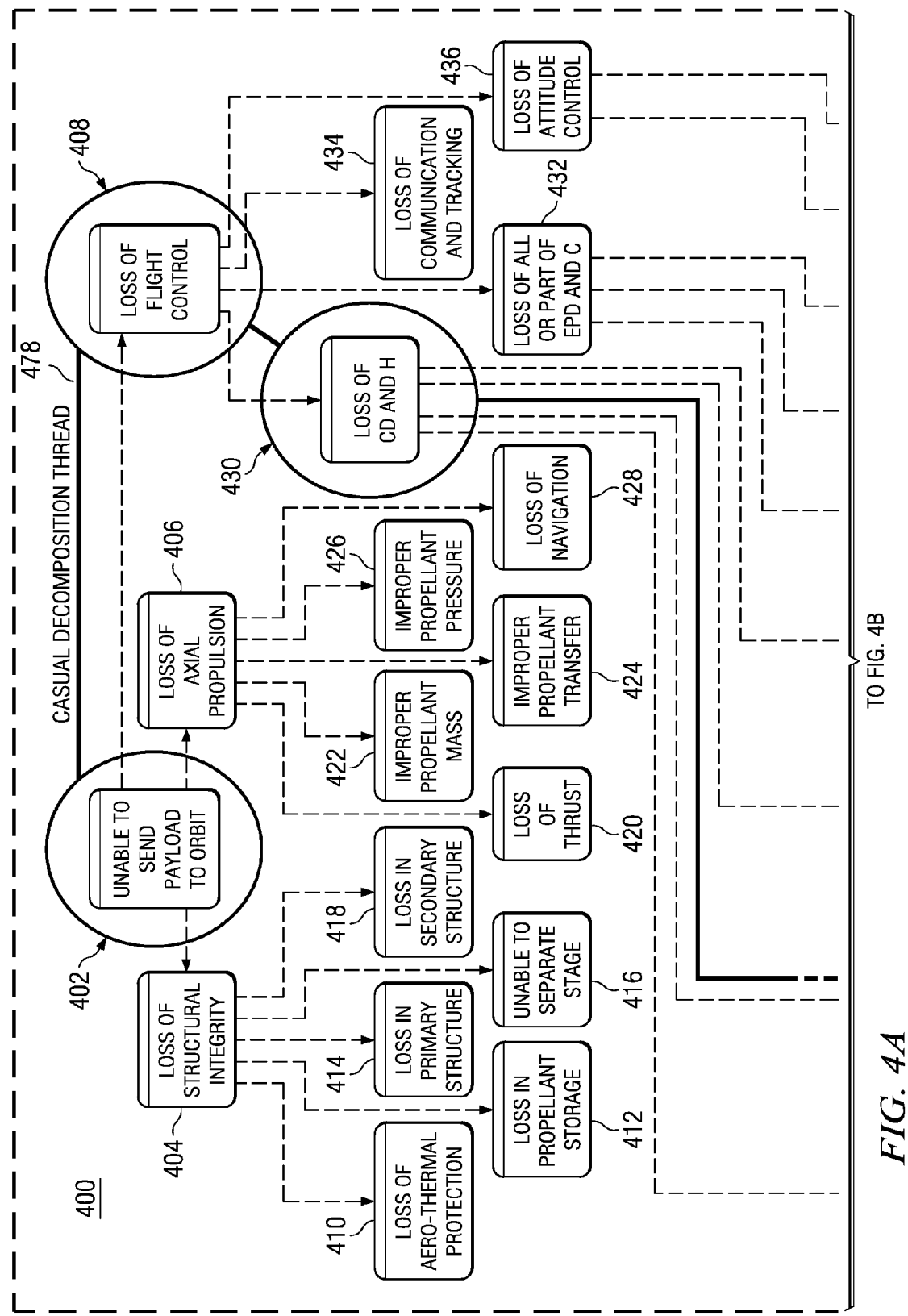
FIGS. 4A and 4B are diagrams of a cause tree in accordance with an advantageous embodiment of the present invention.
Figure 4B:
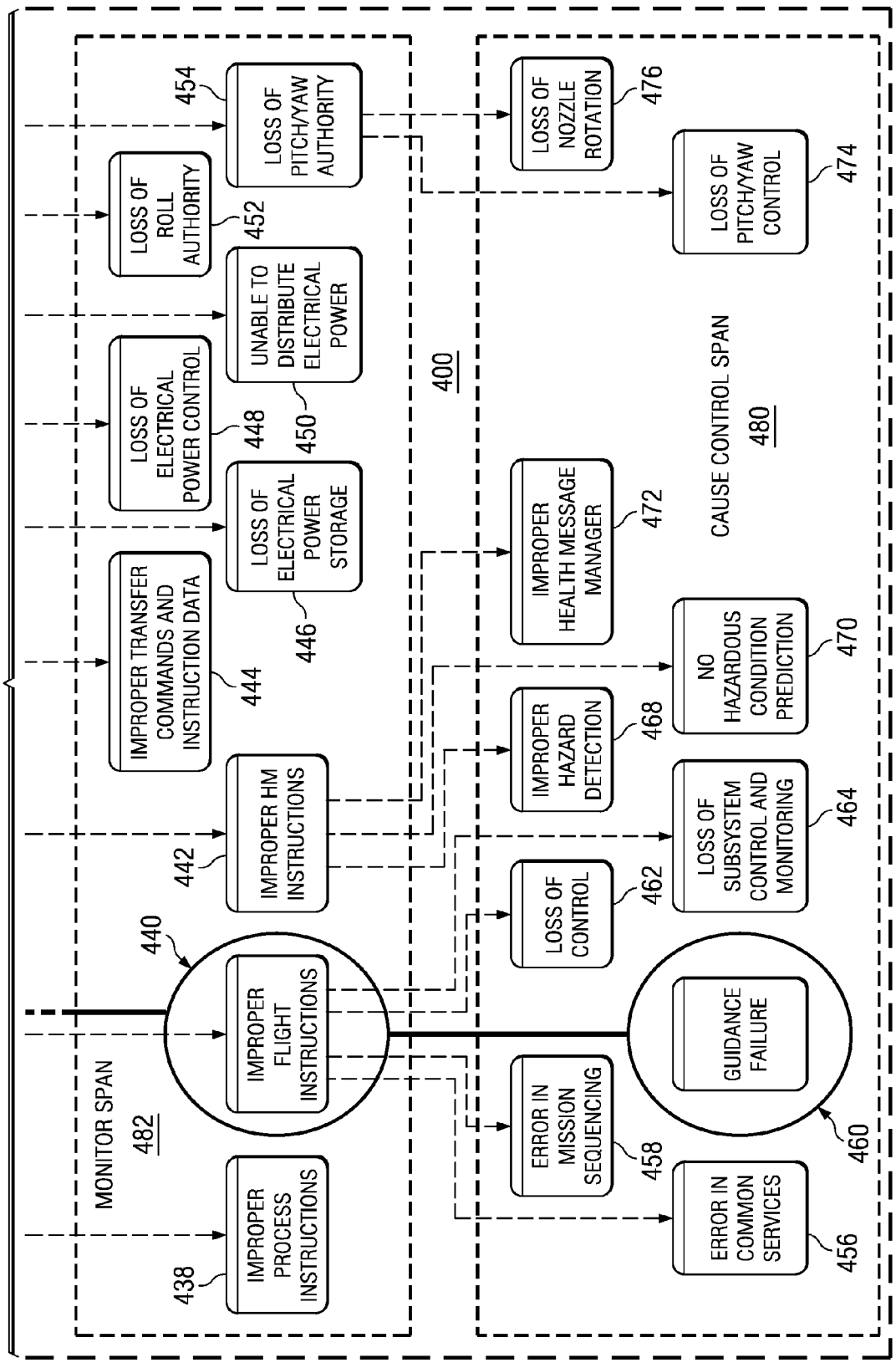

With reference now to FIGS. 4A and 4B, diagrams of a cause tree are depicted in accordance with an advantageous embodiment of the present invention. In this illustrative example, cause tree 400 is an example of cause tree 204 in FIG. 2.

Node 402 is the root node in this example and represents a hazardous condition. In this particular illustrative example, the hazardous condition in node 402 is an inability to send a payload into orbit for a launch vehicle. Causes for node 402 in cause tree 400 are found in nodes 404, 406, and 408. In this example, cause tree 400 has a number of different levels. For example, nodes 404, 406, and 408 are a level below node 402 in the hierarchical structure of cause tree 400. In particular, these nodes are children nodes to node 402.

In these examples, causes for an inability to send a payload into orbit in node 402 are loss of structural integrity in node 404, loss of axial propulsion in node 406, and loss of flight control in node 408. Nodes 404, 406, and 408 are considered causes to the hazardous condition in node 402. Each of these nodes contains sub-causes that result in the causes in nodes 404, 406, and 408.

Node 404 contains nodes 410, 412, 414, 416, and 418. These nodes are sub-causes to node 404. In these examples, sub-causes to loss of structural integrity in node 404 are loss of aero-thermal protection in node 410, loss in propellant storage in node 412, loss in primary structure in node 414, unable (inability) to separate stage in node 416, and loss in secondary structure in node 418.

Next, nodes 420, 422, 424, 426, and 428 are associated with node 406. The causes in these nodes are sub-causes to node 406. The causes of loss of axial propulsion in node 406 are loss of thrust in node 420, improper propellant mass in node 422, improper propellant transfer in node 424, improper propellant pressure in node 426, and loss of navigation in node 428.

Node 408 has nodes 430, 432, 434, and 436 in a level below node 408, and these nodes are sub-causes to the cause in node 408. Causes for loss of flight control in node 408 are a loss of command and data handling (C&DH) in node 430, loss of all or part of electrical power distribution and control (EPD&C) in node 432, loss of communications and tracking in node 434, and loss of attitude control in node 436.

In this particular example, node 430 contains additional sub-causes as found in nodes 438, 440, 442, and 444. In the depicted examples, the loss of C&DH in node 430 may be caused by improper process instructions in node 438, improper flight instructions in node 440, improper HM instructions in node 442, and improper transfer commands and instruction data in node 444.

Next, node 432 contains sub-causes in nodes 446, 448, and 450. The loss of all or part of electrical power distribution and control in node 432 may be caused by loss of electrical power storage in node 446, loss of electrical power control in node 448, and unable to distribute electrical power in node 450.

Node 436 has sub-causes found in nodes 452 and 454. Loss of attitude control in node 436 may be caused by loss of roll authority in node 452 and by loss of pitch/yaw authority in node 454.

Node 440 has sub-causes found in nodes 456, 458, 460, 462, and 464. Causes for improper flight instructions in node 440 are found in nodes 456, 458, 460, 462, and 464. These causes are error in common services in node 456, error in mission sequencing in node 458, guidance failure in node 460, loss of control in node 462, and loss of sub-system control and monitoring in node 464.

Node 442 contains sub-causes found in nodes 468, 470, and 472. The cause of improper health monitoring instructions in node 442 may be caused by causes found in nodes 468, 470, and 472. These causes are improper hazard detection in node 468, no hazardous condition prediction in node 470, and improper health message manager in node 472.

In these examples, node 454 has sub-causes found in nodes 474 and 476. Loss of pitch and yaw authority in node 454 may be caused by loss of pitch/yaw control in node 474 and the loss of nozzle rotation in node 476.

In these illustrative examples, cause threads are a sequence of events or causes that lead to a hazardous condition. A causal decomposition thread in cause tree 400 is a path from the root node, node 402 to one of the terminating nodes. Examples of terminating nodes are nodes 456, 458, 460, 462, 464, 468, 470, 472, 474, and 476.

The identification of threads in cause tree 400 are used to identify the different situations or scenarios that may lead to a hazardous condition. A thread identifies a set of losses to the controls that may lead to a hazardous condition. These losses can be written as follows:

$$\beta = ^{def} \{Sp(\Psi)_c - \{s_{c_1} \ldots, s_{c_n}\} | s_{c_k} \in Sp(\Psi)_{c_k} \text{ with } 1 \leq k \leq n, n \text{ is the cause thread depth of the system}\}$$

where $\{s_{c1} \ldots s_{cn}\}$ refers to a subset of the cause control span $Sp(\Psi)\chi$. The loss of each node from the cause control span represents the loss of a cause control. In other words, $\beta$ represents the set of sequential losses that reduce the cause control strength for some control within the vehicle in relation to the hazard that these controls operate to contain. The definition of this set leads to a potentially smaller set that contains all of the cause threads that may leave a vehicle in a hazardous condition or in an uncontrolled potentially hazardous condition.

The threads may be identified by confirming the loss of the cause control or some hazard cause control function, which can be directly confirmed from a hazard cause tree. The loss of a cause control may lead directly to the development of a hazardous condition or an uncontrolled potential hazardous condition.

For example, causal decomposition thread 478 includes nodes 402, 408, 430, 440, and 460. A guidance failure in node 460 may result in improper flight instructions in node 440. In turn, these improper flight instructions may result in the loss of C&DH in node 430. This failure may result in the loss of flight control in node 408, resulting in the hazardous condition of being unable to send a payload to orbit in node 402.

Many other causal decomposition threads are present and only one causal decomposition thread is depicted for purposes of illustration. For example, another causal decomposition thread may involve nodes 402, 404, and 410. These causal decomposition threads are useful for instrumentation decisions in the development process of a vehicle. An instrumentation decision is a decision as to how data is to be acquired for monitoring various components, systems, or controls in a vehicle. Further, these causal decomposition threads may be used for operational decisions during the functional operation of the vehicle. Operational decisions are decisions relating to how a user interacts with a vehicle.

Within this hierarchy of causes in cause tree 400, spans may be identified for different functions. These spans run across different levels of the hierarchy in cause tree 400. A span is a subset of causes such that each hierarchical decomposition thread has a single element of the thread in the subset. In other words, a horizontal covering of all the hierarchal decomposition threads to the lowest levels of a cause tree should occur. With a covering of hierarchal decomposition threads by span includes an element that represents two or more unique threads due to the fact a subsequent sub-cause of the lower cause depth has several sub-causes, all unique threads will be considered to have been covered by the specific sub-cause from which the two or more causes differentiate themselves.

For example, monitor span 482 includes nodes 438, 440, 442, 444, 446, 448, 450, 452 and 454. These nodes are selected for use in identifying monitors to monitor hazard cause controls such as those found in cause control span 480. These monitors are used to ensure that the controls are operating properly or as expected. If a control is trending or moving towards failing or has failed, then the hazard cause control is no longer preventing the particular cause or causes leading to the development of the hazardous condition. This hazard cause control is defined to be unavailable. This unavailability of the control may lead to a hazardous condition. The different advantageous embodiments of the present invention monitor these hazard cause controls to provide additional safety in avoiding a hazardous condition from occurring.

Cause control span 480 is an example of another span in cause tree 400 and contains nodes 456, 458, 460, 462, 464, 468, 470, 472, 474, and 476. These nodes are identified as nodes for which hazard cause controls may be developed to prevent these causes. In other words, the controls for these nodes are used to prevent events from occurring that may lead to the hazardous condition identified in node 402. These controls may be, for example, software, hardware, or a combination of software or hardware in these particular examples. For example, node 456 identifies a cause as being error in common services. A control may be developed in the design of the vehicle to prevent this type of error from occurring.

By preventing this hazard cause from occurring, improper flight instructions may be avoided with respect to this particular type of cause in node 440. For example, the hazard cause control developed for node 456 may involve a routine that knows the answer that should be generated by common services.

As another example, the hazard cause for loss of control in node 462 may have a hazard control that is designed to avoid loss of control. Guidance failure in node 460 is cause of improper flight instructions occurring in node 440. In this particular example, a control is implemented for this hazard cause within the cause control span 480. The control is a mechanism that is used to prevent the hazard cause in node 460 from occurring. By preventing a guidance failure in node 460, a control for this hazard cause may avoid improper flight instructions from occurring in node 440.

In these examples, the control developed for node 460 may take the form of software, hardware, or a combination of software and hardware depending on the particular implementation. With respect to guidance failure in node 460 the control may be a system in which an error correction system is employed for commands delivered to the guidance system.

When a command is received by the guidance system, the control makes sure that the command was properly encoded using the error correction data. If the data was not correctly encoded, the control asks for the command to be retransmitted. This is one example of a control that may be implemented to prevent the guidance failure from occurring in node 460. Depending on the particular implementation, the control may contain more than one process or mechanism for preventing a guidance failure from occurring.

With respect to generating a monitor in monitor span 482, the monitor may be implemented for improper flight instructions in node 440. For example, with respect to causal decomposition thread 478, a monitor at the level of node 440 may monitor for data from controls implemented for nodes 460, 462, and 464 in these examples.

One example is the control for guidance failure in node 460. The monitor implemented to ensure improper flight instructions do not occur in node 440 and may monitor the control implemented for node 460. For example, if the error control code indicates that the command is incorrect, and the control has not requested a retransmission of the command, then the monitor for node 440 may make a determination that the control for node 460 has failed. Another manner in which the control for node 460 may be monitored is to use data from gyroscopes in the vehicle and determine whether the vehicle is going in the right direction based on the commands being sent to the guidance system. If the vehicle is going in the wrong direction, then the control for error correction for the guidance system may have failed.

In the illustrative embodiments, the monitor may monitor either or both of these types of data to determine whether the control to prevent guidance failure in node 460 is working properly. Of course, other types of monitoring for this type of control may be used depending on the particular implementation. These several types of indicators of whether a control is working properly is called a signature. This signature may be used to verify whether a problem is happening with a particular control.

Cause tree 400 also may be used to identify the data and sensors that are needed to monitor controls, such as those for cause control span 480. Of course, monitor span 482 may be applied at a higher level depending on the particular implementation. The level at which a monitoring span is selected and the level at which a control span is selected may differ for different types of vehicles and different types of systems.

For example, a cause control span may include nodes from different levels in the hierarchy. A similar selection may be made for monitor span 482 depending on the particular implementation. The distance of a monitor from a control in cause tree 400 should be selected such that a monitor can identify the failure in a control before a hazardous condition develops.

When a hazard cause control is applied to all of the causes that affect a cause higher in the hierarchy in cause tree 400, all of the causes at the higher levels are controlled because of the controls placed for the causes at the lower levels. For example, if controls are applied to nodes 410, 412, 414, 416, and 418, the cause of the loss of structural integrity in node 404 will not occur as long as the controls are functioning and in place.

In selecting monitor span 482, each of these nodes is selected to be the same or higher level than the elements in cause control span 480. Placing monitors at a lower level than the related hazard cause controls results in an absence of a guarantee that the correlation of values being monitored will occur.

Further, by placing a monitor at a level lower than the related hazard cause control, an absence of the cause that can lead to a hazardous condition can no longer be confirmed. Thus, as can be seen with respect to cause tree 400, cause controls such as those in cause control span 480 are used to determine or verify that a hazardous condition is not developing or has not occurred.

In the advantageous embodiments, monitors, such as those selected for monitor span 482 are designed to ensure that the hazard cause controls operate within cause control span 480. Verification of cause controls in real time means that a sub-cause cannot occur. When this situation is true for all cause controls, a hazardous condition, such as an inability to send a payload into orbit in node 402 cannot develop.

If a control fails, then attempts may be made to replace the control with the redundant control, restart the control, or take other corrective action. An indication that a hazard cause control has failed provides advance notice of a potential problem. This type of notice allows for corrective action to occur more quickly than monitoring for failures in components. Further, this type of monitoring also provides for monitoring controls with respect to causes that are not related to hardware in the vehicle such as incorrect operations by a user may be monitored by a control.

Figure 5:
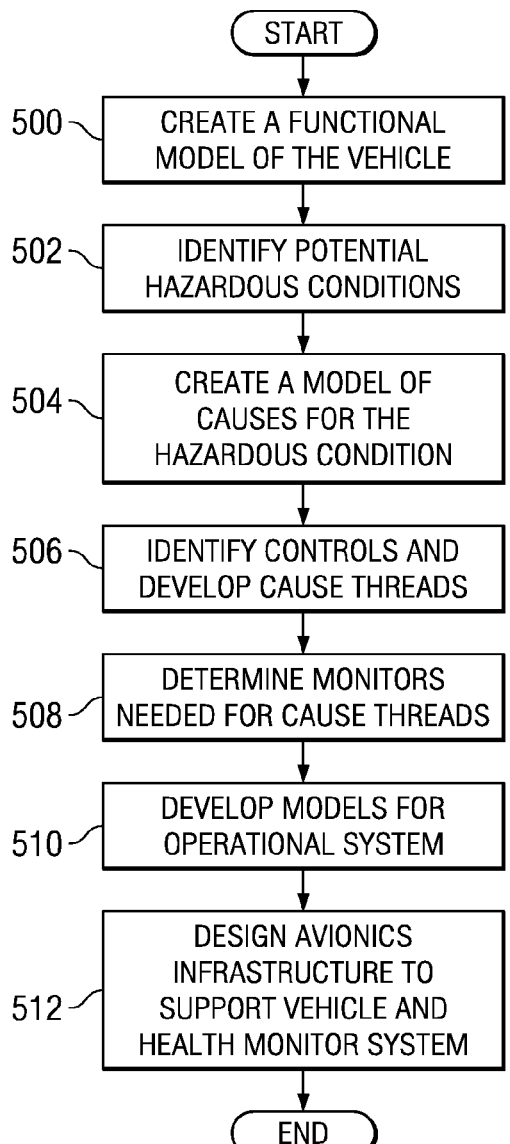
FIG. 5 is a flowchart of a process for designing a health monitor system in accordance with an advantageous embodiment of the present invention.

Turning now to FIG. 5, a flowchart of a process for designing a health monitor system is depicted in accordance with an advantageous embodiment of the present invention. The process illustrated in FIG. 5 may be implemented in one or more tools. In these particular examples, this process is implemented using a design tool, such as health monitor design tool 200 in FIG. 2.

The process begins by creating a functional model of the vehicle (operation 500). This functional model provides a basic system description that may be used to convey the operation and specification of the system. In these examples, the system is a vehicle, such as an aircraft or ship. The functional model created in operation 500 is used to describe how the vehicle operates and the components that are used to create the vehicle.

Thereafter, potential hazardous conditions are identified (operation 502). The identification of potential hazards in operation 502 may be performed by making a safety analysis using a model, such as functional model 202 in FIG. 2. This operation is used to determine all of the possible sources of loss in the operation and design of the vehicle in its operational environment. Operation 502 is used to identify components that may be monitored by the health monitor system.

The determination in operation 502 is made from a functional-down view point instead of from a component level in these examples.

After identifying potential hazardous conditions, a model of the causes for the hazardous conditions is created (operation 504). In these illustrative examples, this model takes the form of a cause tree, such as cause tree 400 in FIG. 4A. Of course, other types of modeling systems may be used depending on the particular embodiment.

Next, controls are identified and cause threads are developed (operation 506). This operation identifies different hazard cause controls within the design of the vehicle that may be monitored by the health monitor system. The number of hazard cause controls identified in these examples is constrained by cause threads of a specified depth which then limits the number of hazard cause controls that need to be monitored. In these examples, the controls are identified by using a cause control span, such as cause control span 480 in FIG. 4B. Operation 506 provides for identifying cause controls, rather than system parts as currently used with traditional health monitor systems.

Then, monitors needed for cause threads are determined (operation 508). The determination of monitors in operation 508 is for hazardous conditions that are capable for all cause threads to a desired cause thread depth in these examples. A monitor may be determined or selected at a level that places the monitor at a lowest cause level within a cause tree as in these examples. In this particular example, the monitors are identified by selecting a monitor span, such as monitor span 482 in FIG. 4B.

Thereafter, models for the operational system are developed (operation 510). In this example, operation 510 is performed after completion of the hazard analysis and all of the hazardous conditions that might have been developed have been identified for the particular design. In this operation, the models are developed using the constraints needed to implement required sensors and processing load of sensory data generated by sensors and data generated by other sub-systems.

The avionics infrastructure is designed to support the vehicle and the health monitor system within the vehicle (operation 512) with the process terminating thereafter. In operation 512, the processing and data handling requirements for the vehicle containing the health monitor system are examined to determine whether these requirements or resources can be met using existing avionics infrastructure in the design for the vehicle. If changes are new, the design of the vehicle is modified to implement these changes. In other words, operation 512 is used to ensure that resources needed to implement a health monitor system are available in the vehicle.

Additionally, the modification of the design to include the needed resources for a health monitor system includes providing the resources needed to provide a timely response to developing or detecting hazardous conditions without impacting the capability of the vehicle to operate normally. Alternatively, in operation 512, an entirely new avionics infrastructure may be designed based on the different requirements for the health monitor system and the vehicle.

Figure 6:
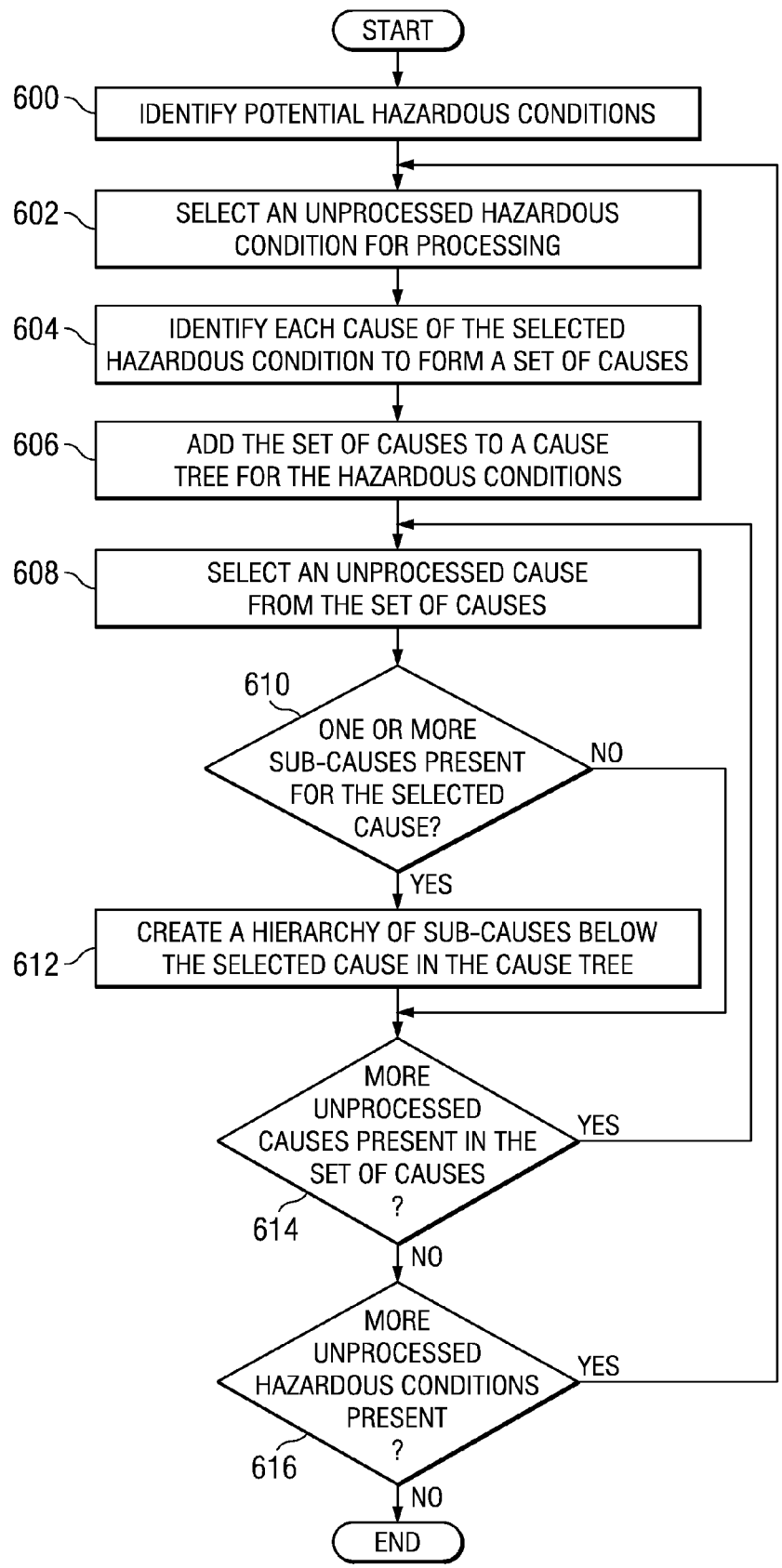
FIG. 6 is a flowchart of a process for creating a model of causes for hazardous conditions in accordance with an advantageous embodiment of the present invention.

With reference next to FIG. 6, a flowchart of a process for creating a model of causes for hazardous conditions is depicted in accordance with an advantageous embodiment of the present invention. The process illustrated in FIG. 6 is a more detailed description of operation 504 in FIG. 5.

The process begins by identifying potential hazardous conditions (operation 600). The identification of these hazardous conditions in operation 600 is made using a functional model, such as functional model 300 in FIG. 3. These different hazardous conditions are identified using a functional hazard analysis of the functional model of the vehicle. This analysis may identify all potential or design-based hazardous conditions that may develop during the operation of the vehicle under different operational modes. This hazard analysis may include results contained in a failure mode effects analysis (FMEA) if the loss of any single part causes a hazardous condition to develop.

Further, the hazard analysis may be used to identify circumstances that lead to a hazardous condition as well as determining a mechanism for controlling the hazardous condition. This analysis also may determine whether or not a control of this condition is present in the current functional model.

Thereafter, an unprocessed hazardous condition is selected for processing (operation 602). Each cause of the selected hazardous condition is identified to form a set of causes (operation 604). The set of causes are then added to a cause tree for the selected hazardous conditions (operation 606). Next, an unprocessed cause is selected from the set of causes (operation 608). A determination is then made as to whether one or more sub-causes are present for the selected cause (operation 610).

If one or more sub-causes are present, a hierarchy of sub-causes is created below the selected cause in the cause tree (operation 612). Then a determination is made as to whether additional unprocessed causes are present in the set of causes (operation 614). If additional unprocessed causes are present, the process returns to operation 608 to select another unprocessed cause from the set of causes for processing. Otherwise, a determination is made as to whether additional unprocessed hazardous conditions are present (operation 616).

If additional unprocessed hazardous conditions are present, the process returns to operation 602. If additional unprocessed hazardous conditions are not present, the operation terminates. Turning back to operation 610, the process proceeds directly to operation 614 if one or more sub-causes are not present for the selected cause.

The result of the process in FIG. 6 is a creation of one or more cause trees. In these examples, a cause tree is created for each hazardous condition. Depending on the particular implementation, a hazardous condition may be a cause or a sub-cause for another hazardous condition. Alternatively, a single cause tree may be created with the hazardous condition at the top of the tree being a loss or damage to the vehicle.

Figure 7:
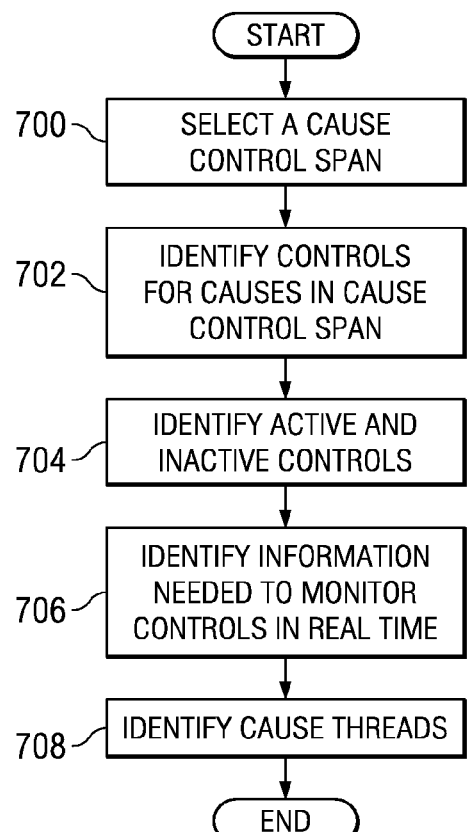
FIG. 7 is a flowchart of a process for identifying controls in a vehicle and developing cause threads in accordance with an advantageous embodiment of the present invention.

Turning now to FIG. 7, a flowchart of a process for identifying controls in a vehicle and developing cause threads is depicted in accordance with an advantageous embodiment of the present invention. The process illustrated in FIG. 7 is a more detailed description of operation 506 in FIG. 5.

The process begins by selecting a cause control span (operation 700). This cause control span is selected to include a subset of causes within a cause tree such that each hierarchical decomposition thread has a single node of the thread in the subset.

An example of a cause control span is cause control span 480 in FIG. 4B. The different causes in a cause control span represent causes for which controls may be created to prevent those causes from occurring.

The cause control span selected in operation 700 may be used to create controls for the different causes within the cause control span to allow a vehicle to avoid a hazardous condition. This cause control span may be selected in a number of different ways. For example, the span may contain all causes that do not have sub-causes.

Alternatively, causes at higher levels in the cause tree may be used. A cause at a level higher than the cause controls in the cause control span also is controlled because the causes of these causes are now controlled through the controls identified in the cause control span. In the advantageous embodiments, the selection of cause controls is used to ensure that a hazardous condition is not present or is not developing.

Thereafter, the hazard cause controls are identified for each of the causes in the cause control span selected (operation 702). These hazard cause controls are controls to prevent causes from occurring. The hazard cause control may be a software process, a hardware control, some combination of the two, or some operational, ambient environment, or other condition that precludes the development of the hazard cause.

From the controls identified for the causes in the cause control span, active and inactive controls are identified (operation 704). An active control is a control in which the loss of the control leads directly to the development of a hazardous condition. For example, proper operation of a thrust vector controller is an active control to a hazardous condition in which loss of control of the vehicle occurs. The loss of this control to the hazard causes a direct development of a hazardous condition that may lead to a loss.

An inactive control is a control in which a loss of the control does not result directly in a hazard. Instead, the hazard may or may not develop. For example, with a shuttle orbiter moving towards a space station to dock with the space station, a loss of navigation or routines in the computer renders the two vehicles unable to coordinate the approach for the docking operation. The navigational system is one of the controls to the hazard, which is a collision between orbiter and the space station during the docking process.

The loss of this control (navigation or routines) does not mean that the two vehicles will collide. However, the movement relative to the two vehicles is no longer constrained after the loss of the control for this hazard cause.

Thereafter, the information needed to monitor controls in real time is identified (operation 706). The information needed depends on the type of control. For active controls, the information needed may be the data within the vehicle that indicates that the controls are operational. This information may be provided, for example, by instrument self test or data monitoring in real time.

Alternatively, if the control is something outside of the basic design of the vehicle, the information needed for a monitor is some indication that the control is properly functioning. A control outside of the basic design of the vehicle may be, for example, the operator or the environment. An example is a monitor that watches over the physical condition of a pilot or the ambient temperature within a lab that has active air conditioning.

Further, the information needed by a monitor may be trended. If the information can be trended, the hazard cause control can also be trended. One example is a change in temperature. A trend in the change of temperature may indicate problem in the air conditioning unit and, based on causal relationships, indicate that a hazardous condition (failure of a computer system, for instance) is becoming imminent.

For inactive controls, loss of the hazard cause control indicates only the absence of the means of prohibiting the development of a hazardous condition. It does not indicate that the hazardous condition necessarily will develop. Rather, this situation results in a potential for development of the hazard.

In identifying the information needed to monitor the controls in real time in operation 706, the information needed to identify the loss of controls may be made by selecting sensors with a function to monitor specific controls in real time in these examples. Thereafter, cause threads are identified (operation 708) with the process terminating thereafter.

Figure 8:
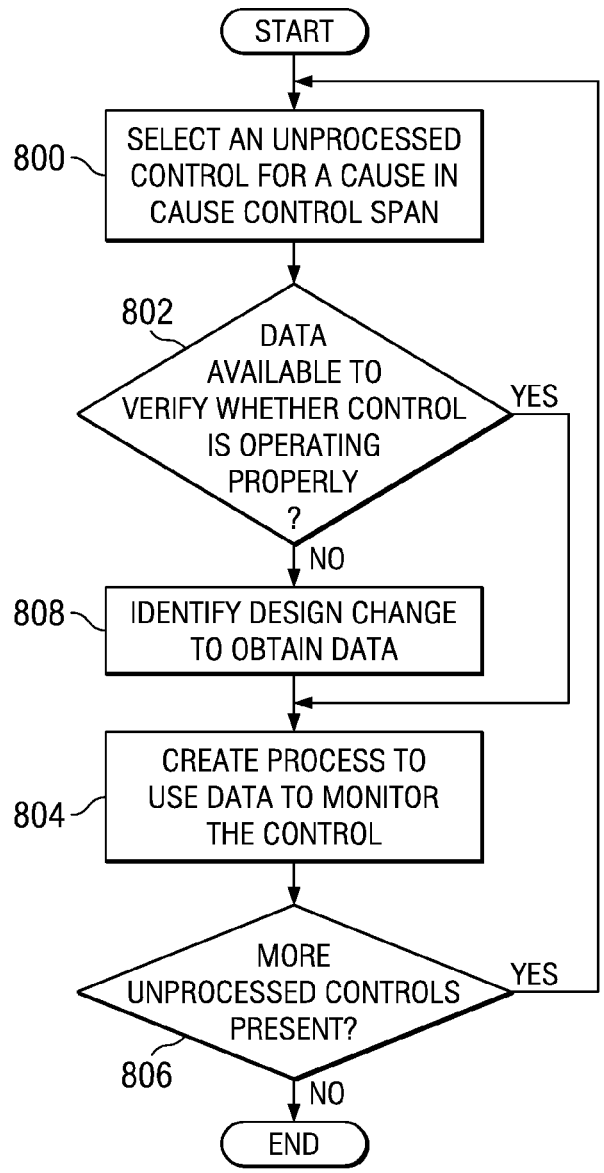
FIG. 8 is a flowchart of a process for creating monitors to monitor controls in accordance with an advantageous embodiment of the present invention.

With reference now to FIG. 8, a flowchart of a process for creating monitors to monitor controls is depicted in accordance with an advantageous embodiment of the present invention. The process illustrated in FIG. 8 is a more detailed description of operation 508 in FIG. 5.

The process begins by selecting an unprocessed control for a cause in a cause control span (operation 800). Next, a determination is made as to whether data is available to verify whether the control is operating properly (operation 802). If the data is present or available, a process is created to use the data to monitor the control (operation 804). In operation 804, the process is designed to detect when a hazard cause control put in place to prevent a cause for a hazardous condition fails or is moving towards a state in which the hazard cause control will fail.

In other words, operation 804 is used to create a monitor for a control. In these examples, a monitor is used to analyze data in real time to detect when a control is not operating properly. A control does not operate properly when the control has failed or is trending or moving towards a state in which a failure will occur. Further, a control does not operate properly if the control generates errors or does not function as expected.

Real time processing of data occurs when data is processed within a time in which the state of the system can change from that of normal operation to a non-normal operation or hazardous state within the time period that it takes to change the command for the next vehicle control command. Further, real time processing also includes an ability to generate a response to this state in addition to processing the data.

In this example, the response may be an alert indicating that the hazard cause control has been lost that is sent to an operator or control system. This response also may include a suggested action. Sufficient time should be present to allow an operator or control system to take the action.

Thereafter, a determination is made as to whether additional unprocessed hazard cause controls are present (operation 806). If additional unprocessed controls are present, the process returns to operation 800 to select another hazard control for processing. If additional unprocessed hazard cause controls are not present, the process terminates. With reference again to operation 802, if the data needed to verify whether the hazard cause controls are present, then a design change to obtain the needed data is identified (operation 808). The process proceeds to operation 804 as described above.

In operation 808, the design change may include adding a sensor to obtain the data needed by the hazard cause control monitor. The design change also may be, for example, the addition of an interface to data path to the monitor to obtain information about the hazard cause control. The interface or information also may be obtained from other components or systems in the vehicle to obtain the data needed to verify whether the control is operating properly. This design change involves creating instrumentation needed to obtain the data to monitor the control.

At this point, the hazard analysis for the design of the vehicle is complete and the various hazardous conditions that may develop have been identified. Further, for each hazardous condition, an identification of the causes including the different scenarios that may cause the hazardous condition has been identified. These different scenarios are the cause threads. Depending on the implementation, these cause threads may have been identified only for hazards that have certain severity levels, such as catastrophic or critical, rather than all those that impede the performance. Further, at this point, the instrumentation and data needed to monitor the controls have been identified.

The advantageous embodiments of the present invention provide a computer implemented method, apparatus, and computer usable program code for designing a system. This system may be, for example, a vehicle. Hazardous conditions are identified for the system. Thereafter, a model for the set of hazardous conditions is created. This model contains causes for the set of hazardous conditions. This set of hazardous conditions may be one or more hazardous conditions depending on the system. Thereafter, controls are identified for the causes to prevent the set of hazardous conditions from occurring. A monitoring system is designed to monitor the set of controls for the system.

A system control refers to the devices in the vehicle that accept input from other device subsystems or external operator to induce a specific expected behavior. The system control may be, for example, hardware, software, a combination of hardware and software, or other systems. Also, a number of these operations may be computer implemented in the sense that they receive user input. For example, an operation for identifying hazard conditions or creating a functional model may be made through user input to the program. The software created to implement some embodiments may be a mixture of these types of operations in which user input is received. In other embodiments, artificial intelligence and other techniques may be used to actually perform the operation operations such as identifying hazardous conditions. The exact implementation of which operations are completed performed by software, performed by a mix software and user input, and user input depend on the particular implementation.

Figure 9:
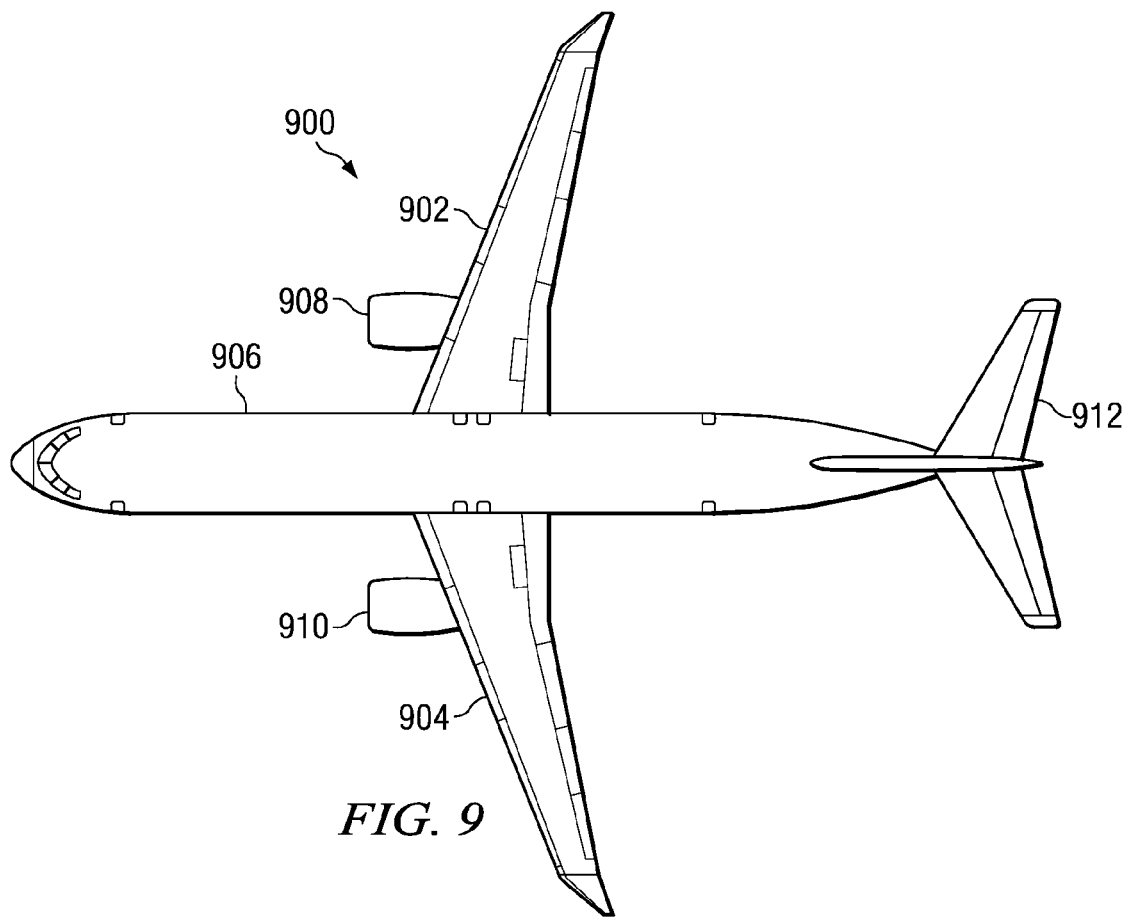
FIG. 9 is a diagram of an aircraft in which an advantageous embodiment of the present invention may be implemented.

With reference to FIG. 9, a diagram of an aircraft is depicted in which an advantageous embodiment of the present invention may be implemented. Aircraft 900 is an example of an aircraft in which a health monitoring system may be implemented in accordance with an advantageous embodiment of the present invention. In this illustrative example, aircraft 900 has wings 902 and 904 attached to body 906. Aircraft 900 includes wing mounted engine 908, wing mounted engine 910, and tail 912.

Aircraft 900 is an example of one type vehicle in which a health monitor system in accordance with an advantageous embodiment of the present invention may be implemented. The health monitor system described in the different illustrative embodiments may be implemented in any type vehicle. For example, the health monitor system described in these examples may be implemented in vehicles such as a ship, an aircraft, an automobile, a spacecraft, a launch vehicle, or a submarine. Further, the health monitor system described in these examples also may be implemented in other types of systems, such as a building, a dam, a power plant, a manufacturing facility, or an oil drilling rig.

Figure 10:
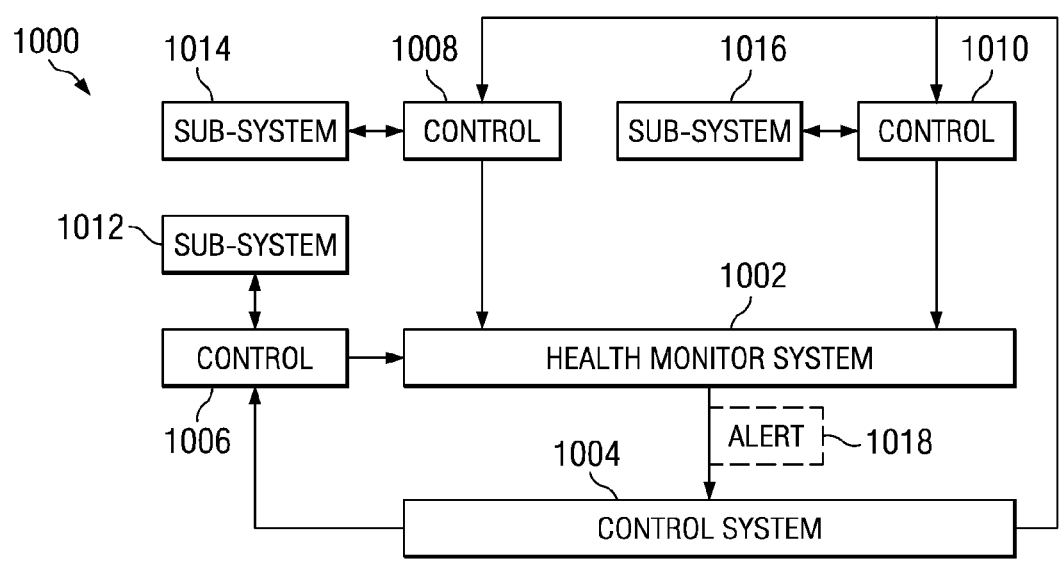
FIG. 10 is a diagram of a system in which health monitoring is performed in accordance with an advantageous embodiment of the present invention.

Turning now to FIG. 10, a diagram of a system in which health monitoring is performed is depicted in accordance with an advantageous embodiment of the present invention. System 1000, in these examples, is implemented in an aircraft, such as aircraft 900 in FIG. 9. Of course, system 1000 may be implemented in other types of systems other than an aircraft or even vehicles. System 1000 contains health monitor system 1002 and control system 1004. Health monitor system 1002 monitors hazard cause controls 1006, 1008, and 1010. System 1000 also includes sub-systems 1012, 1014 and 1016.

Sub-systems 1012, 1014, and 1016 represent the different hardware and software that make up a system, such as a vehicle. A sub-system may be, for example, a guidance system, a hydraulics system, an engine, valve, a fuel system, or landing gear.

Control system 1004 may influence both hazard cause controls 1006, 1008, and 1010 and sub-systems 1012, 1014, and 1016. In these examples, health monitor system 1002, control system 1004, and hazard cause controls 1006, 1008, and 1010 form a hazard prevention system. This hazard prevention system is employed to prevent a hazardous condition from occurring in these examples.

Hazard cause controls 1006, 1008, and 1010 are controls associated with a cause for a hazardous condition generated based on a functional model of system 1000. These controls are designed to prevent a cause that alone or in combination with other causes may result in a hazardous condition in a vehicle, such as aircraft 900 in FIG. 9. In these examples, hazard cause controls 1006, 1008, and 1010 may or may not be used to control or manage sub-systems 1012, 1014, and 1016, respectively.

If, for example, sub-system 1012 is a guidance system, hazard cause control 1006 may be a control that prevents a guidance failure from occurring. This control may take the form of a command handling process that includes error correction controls in which commands identified to contain errors are not processed. Instead, a command that is identified as being erroneous based on error correction data is re-requested to prevent the execution of erroneous commands.

Health monitor system 1002 monitors hazard cause control 1006 to ensure that this hazard cause control is operating properly. This type of monitoring is in contrast to the current system of monitoring the actual components for failures. Instead, the hazard cause controls to prevent a failure are monitored.

Health monitor system 1002 monitors these controls either by obtaining data directly from the system controls or from other sources. Health monitor system 1002 processes data used to monitor the hazard cause controls in real time in these examples. In the example of the control for a guidance system, health monitor system 1002 may monitor hazard cause control 1006 by obtaining data from a gyroscope and determining whether the direction of the vehicle is correct with respect to the commands being processed by the guidance system. If the direction of the vehicle identified using the gyroscope is incorrect with respect to the guidance system, then hazard cause control 1006 may be identified as having failed.

If health monitor system 1002 identifies or detects a hazard cause control that is no longer operating properly, health monitor system 1002 generates alert 1018 and sends alert 1018 to control system 1004. When implemented in a vehicle, control system 1004 is referred to as a vehicle control system. Alert 1018, in these examples, may contain an identification of the hazard cause control that is no longer operating properly. Further, alert 1018 also may include a suggested action to be taken.

In response to receiving alert 1018, control system 1004 may then initiate any corrective action necessary with respect to these controls. The corrective action may be, for example, to use another sub-system that reestablishes the hazard cause control and itself provides redundancy to the hazard cause control identified as operating improperly. Control system 1004 also may restart the hardware or software for the hazard cause control. Another corrective action may include, for example, providing an alert or indication to an operator of the system that a particular control is no longer available. In addition, health monitor system 1002 in processing data in real time, in these examples, includes sufficient time for control system 1004 to take a corrective action in response to receiving alert 1018.

Figure 11:
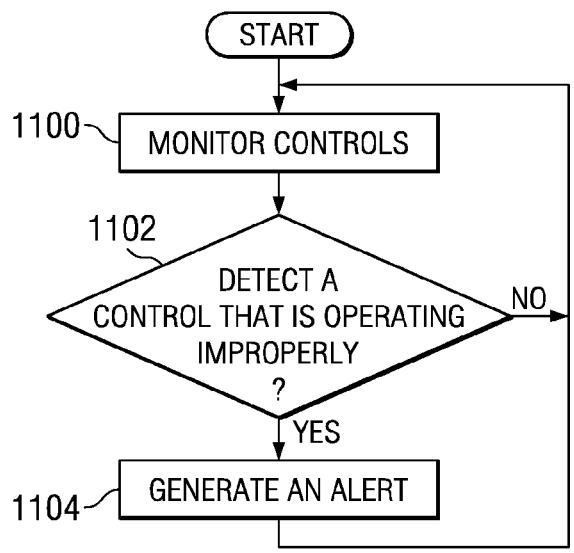
FIG. 11 is a flowchart of a process for monitoring controls depicted in accordance with an advantageous embodiment of the present invention.

With reference now to FIG. 11, a flowchart of a process for monitoring controls is depicted in accordance with an advantageous embodiment of the present invention. The process illustrated in FIG. 11 is an example of a process that may be implemented in a health monitor system, such as health monitor system 1002 in FIG. 10.

The process begins by monitoring controls in the system (operation 1100). A determination is made as to whether a hazard cause control is detected that is operating improperly (operation 1102). In these examples, a hazard cause control is operating improperly if the control is trending or moving towards failing or has failed, providing the means for a hazardous condition to develop. If a hazard cause control is operating improperly, the process generates an alert (operation 1104) with the process returning to operation 1100. In these examples, the alert may include an identification of the hazard cause control that is no longer operating properly. This alert may be sent to a control system, such as control system 1004 in FIG. 10. If an improperly operating hazard cause control is not detected, the process returns to operation 1100 as described above.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

In these examples, a hazard cause control refers to a component that may be hardware, software, a combination of software and hardware, or other system design or operational characteristics that prevents the development of a hazardous condition in the system. This type of control prevents the development of specific conditions that could lead to a hazardous condition in which a loss of life, loss of asset, or mission may occur.

The advantageous embodiments of the present invention also provide a method and apparatus for hazard prevention. A vehicle has a hazard prevention system. The hazard prevention system includes a set of hazard cause controls that are part of the system operation or design, a health monitor system, and a vehicle control system. The set of hazard cause controls are associated with one or more hazardous conditions and each hazard control is used to prevent the development of a hazardous condition in the operation of the vehicle. The health monitor system monitors the hazard cause controls to determine if the each of these controls is operating properly and generates an alert if a control is operating improperly. Loss of proper operation of a hazard control provides the opportunity for the hazardous condition whose cause the control is restraining to develop and for loss to occur. The control system is in communication with the health monitor system, wherein the control system receives an alert from the health monitor system regarding loss of a hazard control and potential or verified development of a hazardous condition. The control system then provides a corrective action to avoid the hazardous condition.

In one advantageous embodiment of the present invention, a system has a plurality of sub-systems, a set of hazard cause controls for identified causes of hazardous conditions, a health monitor system, and a control system. The set of hazard cause controls are associated with specific hazardous condition identified for the system and each hazard cause control controls precludes the hazardous condition from developing. The health monitor system monitors the set of hazard cause controls to determine if the set of hazard cause controls is operating properly and generates an alert if a hazard cause control in the plurality of hazard cause controls is operating improperly or not operating. The system control sub-system is in communication with the health monitor system and receives the alert and provides a corrective action to avoid the hazardous condition from occurring.

In these examples, a hazard cause control refers to a component that may be hardware, software, a combination of software and hardware, or other system design or operational characteristics that prevent the development of a hazardous condition in the system. This type of control prevents the development of specific conditions that could lead to a hazardous condition in which a loss of life, loss of asset, or mission may occur.

Thus, the different advantageous embodiments of the present invention also provide a vehicle with a hazard prevention system. This hazard prevention system includes hazard cause controls, real time hazard cause control monitors, a health monitor system, and a vehicle control system. The hazard cause controls are associated with a hazardous condition and each control controls the development of a hazardous condition due to one or more causes in the vehicle. The health monitor system monitors the hazard cause controls to determine if each of the controls is operating properly and generates an alert if a control is operating improperly. The vehicle control system is in communication with the health monitor system, wherein the vehicle control system receives the alert and provides a corrective action to avoid the hazardous condition.

The description of the present invention has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A computer implemented method for designing a health monitor system for a vehicle, the computer implemented method comprising:
    creating a functional model of the vehicle;
    identifying a hazardous condition that can occur during operation of the vehicle using the functional model;
    creating a model of causes for the hazardous condition;
    identifying hazard cause controls to avoid the hazardous condition using the model of causes, wherein the controls prevent causes for the hazardous condition from occurring; and
    identifying a set of monitors to monitor the hazard cause controls.

2. The computer implemented method of claim 1, wherein the step of creating the model of causes for the hazardous conditions comprises:
    creating a cause tree containing the causes for the hazardous condition, wherein a root node represents the hazardous condition and nodes below the root node represent the causes that can result in the hazardous condition.

3. The computer implemented method of claim 2, wherein the step of identifying the controls comprises:
    identifying a cause control span in the cause tree.

4. The computer implemented method of claim 3, wherein the step of identifying the set of monitors comprises:
    identifying a monitor span in the cause tree, wherein the monitor span is located on a level of the cause control span in a hierarchy of the cause tree.

5. The computer implemented method of claim 3, wherein the step of identifying the hazard cause controls to avoid the hazardous condition using the model of causes comprises:
    identifying the hazard cause controls to prevent causes found in the cause control span from occurring.

6. The computer implemented method of claim 3, wherein the step of identifying the cause control span in the cause tree as nodes comprises:
    identifying selected nodes for the cause control span as ones having a lowest level in the hierarchy of the cause tree.

7. The computer implemented method of claim 1, wherein the step of identifying the set of monitors to monitor the hazard cause controls comprises:
    determining whether a hazard cause control in the set of hazard cause controls can be monitored in using assets present in the functional model of the vehicle; and
    modifying the functional model of the vehicle to provide a monitor for the unattended hazard cause control.

8. The computer implemented method of claim 1, wherein the step of creating the functional model of the vehicle comprises:
    creating the functional model for one of an aircraft, a ship, an automobile, a space craft, a launch vehicle, or a submarine.

9. A computer implemented method for designing a system, the computer implemented method comprising:
    identifying a set of hazardous conditions for the system;
    creating a model for the set of hazardous conditions by creating a cause tree containing the set of hazardous conditions and a plurality of causes for the set of hazardous conditions;
    identifying a set of hazard cause controls for the causes to prevent the set of hazardous conditions from occurring; and
    designing a monitoring system to monitor the set of hazard cause controls for the system.

10. The computer implemented method of claim 9, wherein the cause tree contains the causes for the hazardous condition, and wherein a root node represents the hazardous condition and nodes below the root node represent the causes that can result in the hazardous condition.

11. The computer implemented method of claim 9, wherein the step of identifying the set of hazard cause controls further comprises:
    designing multiple hazard cause controls to prevent a cause in the plurality of causes.

12. The computer implemented method of claim 9, wherein the step of identifying the set of hazardous conditions for the system comprises:
identifying the set of hazardous conditions for one of a building, a dam, a power plant, an aircraft, a ship, an automobile, a space craft, a launch vehicle, or a submarine.

13. A computer program product comprising:
a computer usable medium having computer usable program code for designing a health monitor system for a vehicle, the computer program product comprising:
computer usable program code for creating a functional model of the vehicle;
computer usable program code for identifying a hazardous condition that can occur during operation of the vehicle using the functional model;
computer usable program code for creating a model of causes for the hazardous condition;
computer usable program code for identifying hazard cause controls to avoid the hazardous condition using the model of causes, wherein the hazard cause controls prevent causes for the hazardous condition from occurring; and
computer usable program code for identifying a set of monitors to monitor the controls.

14. The computer program product of claim 13, wherein the computer usable program code for creating the model of causes for the hazardous condition comprises:
computer usable program code for creating a cause tree containing the causes for the hazardous condition, wherein a root node represents the hazardous condition and nodes below the root node represent the causes that can result in the hazardous condition.

15. The computer program product of claim 14, wherein the computer usable program code for identifying the hazard cause controls comprises:
computer usable program code for identifying a cause control span in the cause tree.

16. The computer program product of claim 15, wherein the computer usable program code for identifying the set of monitors comprises:
computer usable program code for identifying a monitor span in the cause tree, wherein the monitor span is located on a level of the cause control span in a hierarchy of the cause tree.

17. The computer program product of claim 15, wherein the computer usable program code for identifying the controls to avoid the hazardous condition using the model of causes comprises:
computer usable program code for identifying the controls to prevent causes found in the cause control span from occurring.

18. The computer program product of claim 15, wherein the computer usable program code for identifying the cause control span in the cause tree as nodes comprises:
computer usable program code for identifying selected nodes for the cause control span as ones having a lowest level in the hierarchy of the cause tree.

19. The computer program product of claim 13, wherein the computer usable program code for identifying the set of monitors to monitor the controls comprises:
computer usable program code for determining whether a control in the controls can be monitored in using assets present in the functional model of the vehicle; and
computer usable program code for modifying the functional model of the vehicle to provide a monitor for the control.

20. The computer program product of claim 13, wherein the computer usable program code for creating the functional model of the vehicle comprises:
computer usable program code for creating the functional model for one of an aircraft, a ship, an automobile, a space craft, a launch vehicle, or a submarine.

* * * * *